(12) United States Patent
Drescher

(10) Patent No.: US 8,742,774 B2
(45) Date of Patent: Jun. 3, 2014

(54) APPARATUS FOR MEASURING A RADIUS OF A WORKPIECE

(75) Inventor: Joseph D. Drescher, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 347 days.

(21) Appl. No.: 13/236,190

(22) Filed: Sep. 19, 2011

(65) Prior Publication Data

US 2013/0069674 A1  Mar. 21, 2013

(51) Int. Cl.
    *G01R 27/26* (2006.01)

(52) U.S. Cl.
    USPC .......................................................... 324/688

(58) Field of Classification Search
    USPC ......... 324/688, 682–683, 672, 600, 707–714; 340/870.18–870.37
    See application file for complete search history.

(56) References Cited

U.S. PATENT DOCUMENTS

| | | | |
|---|---|---|---|
| 3,641,431 A | 2/1972 | Pigage et al. | |
| 4,410,852 A | 10/1983 | Guretzky | |
| 4,620,281 A | 10/1986 | Thompson et al. | |
| 4,820,972 A | 4/1989 | Scott et al. | |
| 4,914,828 A | 4/1990 | Fiedor et al. | |
| 5,196,800 A | 3/1993 | Graff et al. | |
| 5,486,076 A * | 1/1996 | Hauschopp | 409/179 |
| 6,079,113 A | 6/2000 | Helmrichs | |
| 6,237,907 B1 * | 5/2001 | Lawrence | 269/287 |
| 6,400,162 B1 | 6/2002 | Mallory et al. | |
| 7,114,399 B2 | 10/2006 | Mallory | |
| 7,497,027 B2 | 3/2009 | Waltz, Jr. | |
| 7,685,726 B2 * | 3/2010 | Fuchs et al. | 33/503 |
| 2010/0265324 A1 * | 10/2010 | Spalding | 348/92 |
| 2011/0043803 A1 * | 2/2011 | Nygaard et al. | 356/399 |

OTHER PUBLICATIONS

EP Search Report for EP 12184881, dated Dec. 14, 2012.
HS710 DSP Sensor, Laser Gauge Products, Origin Technologies Corporation, www.origintech.com, 2009.
Capacitive Sensor Operation and Optimization (How Capacitive Sensors Work and How to Use Them Effectively), Capacitive Sensor TechNote LT03-0020, Lion Precision, Copyright 2007, www.lionprecision.com.
Capacitance Measurement Systems, MTI Instruments, www.mtiinstruments.com, 2009.
Baxter, "Capacitive Sensors", IEEE Press, Piscataway, N.J., 1997.

* cited by examiner

*Primary Examiner* — Melissa Koval
*Assistant Examiner* — Trung Nguyen
(74) *Attorney, Agent, or Firm* — O'Shea Getz P.C.

(57) ABSTRACT

An apparatus for measuring a workpiece includes a capacitance probe mounted to a probe housing and a non-conductive spacer. The capacitance probe includes a probe tip with a sensor surface that emits an electric field. The non-conductive spacer extends between a probe contact surface and a workpiece contact surface. The probe contact surface covers the sensor surface, and the workpiece contact surface contacts the workpiece during the measuring of the radius.

14 Claims, 4 Drawing Sheets

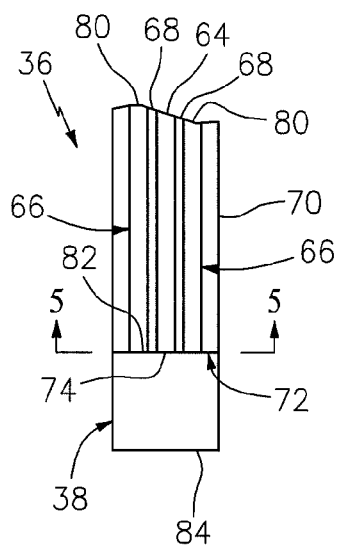
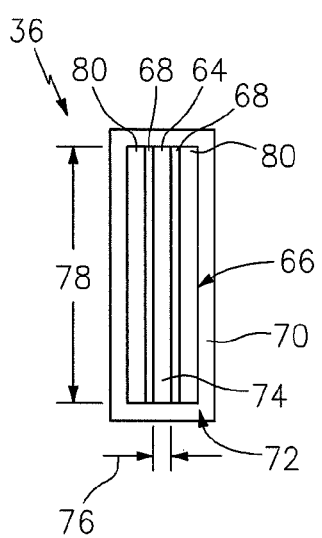
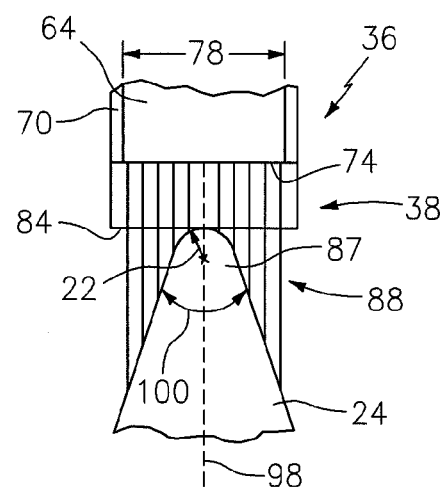
FIG. 4         FIG. 5         FIG. 7
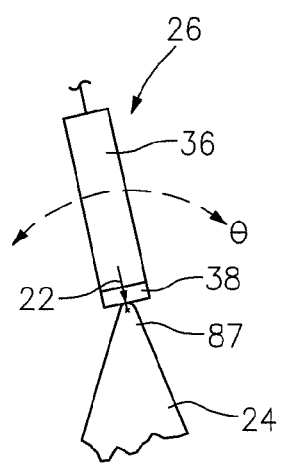
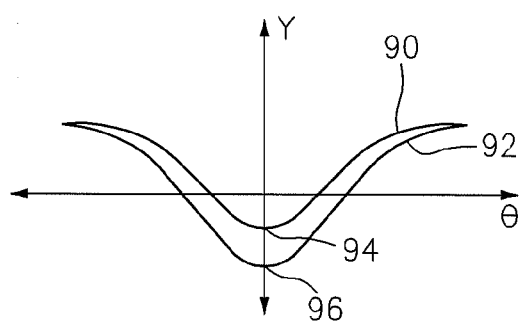
FIG. 8         FIG. 9

US 8,742,774 B2

APPARATUS FOR MEASURING A RADIUS OF A WORKPIECE

BACKGROUND OF THE INVENTION

1. Technical Field

The present invention relates to measurement devices and gages and, in particular, to an apparatus for electronically measuring a radius of a workpiece.

2. Background Information

Electronic sensors may be used to determine various characteristics of workpieces. A typical non-contact sensor, for example, may include a capacitance probe mounted to a stationary probe holder. The probe holder may be connected to a workpiece holder that locates a workpiece a distance from the capacitance probe. During operation, the non-contact sensor may determine the aforesaid distance between the capacitance probe and the workpiece. The determined distance may be subsequently processed to determine a characteristic of the workpiece.

SUMMARY OF THE DISCLOSURE

According to an aspect of the invention, an apparatus for measuring a workpiece (e.g., a radius of the workpiece) includes a capacitance probe mounted to a probe housing, and a non-conductive spacer. The capacitance probe includes a probe tip with a sensor surface that emits an electric field. The non-conductive spacer extends between a probe contact surface and a workpiece contact surface. The probe contact surface covers the sensor surface, and the workpiece contact surface contacts the workpiece during the measuring of the radius.

The foregoing features and the operation of the invention will become more apparent in light of the following description and the accompanying drawings.

BRIEF DESCRIPTION OF THE DRAWINGS

FIG. 4 is a partial front sectional illustration of a capacitance probe and a non-conductive spacer;

FIG. 5 is a cross-sectional illustration of a capacitance probe;

FIG. 7 is a partial side sectional illustration of a capacitance probe and a workpiece;

FIG. 8 is a side view illustration of an electronic radius gage contacting a workpiece;

FIG. 9 graphically illustrates changes in output voltages versus degrees pivoted by a capacitance probe;

DETAILED DESCRIPTION OF THE INVENTION

Figure 1:
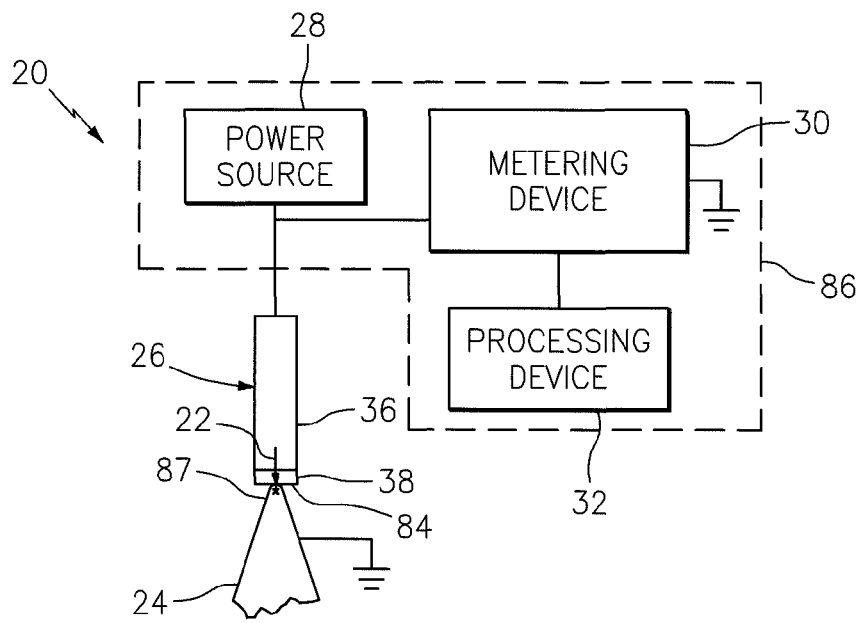
FIG. 1 is a schematic illustration of an apparatus for electronically measuring a radius of a workpiece.

FIG. 1 is a schematic illustration of an apparatus 20 for electronically measuring a radius 22 of a workpiece 24. The apparatus 20 may include an electronic radius gage 26, a power source 28 (e.g., an AC power source), a metering device 30 (e.g., a digital or analog multimeter) and a processing device 32.

Figure 2:
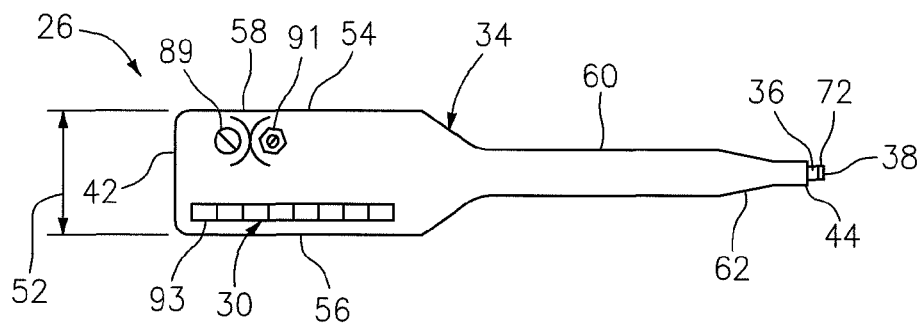
FIG. 2 is a front view illustration of an electronic radius gage.
Figure 3:
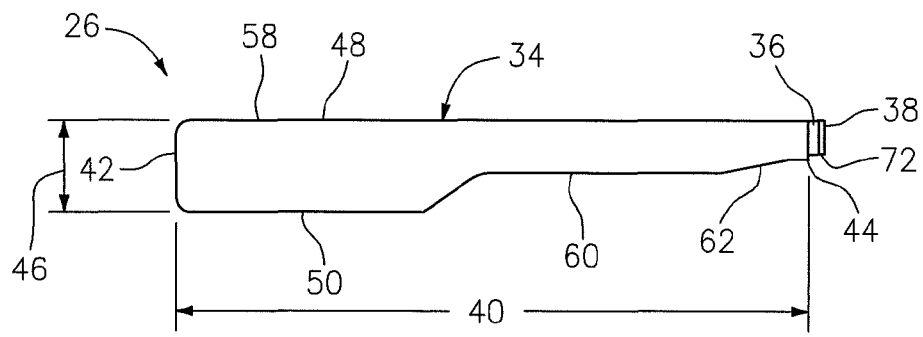
FIG. 3 is a side view illustration of the radius gage illustrated in FIG. 2.

FIG. 2 is a front view illustration of the radius gage 26. FIG. 3 is a side view illustration of the radius gage 26. Referring to FIGS. 2 and 3, the radius gage 26 includes a probe housing 34 (e.g., a non-conductive, handheld probe housing), a capacitance probe 36 and a non-conductive spacer 38.

Referring to FIG. 3, the probe housing 34 has a housing length 40 that extends longitudinally between a first housing end 42 and a second housing end 44. The probe housing 34 has a housing width 46 that extends between a first housing side 48 and a second housing side 50. Referring to FIG. 2, the probe housing 34 has a housing thickness 52 that extends between a third housing side 54 and a fourth housing side 56. Referring to FIGS. 2 and 3, the housing length 40, the housing width 46 and the housing thickness 52 may be sized such that the probe housing 34 may be manipulated (e.g., held, moved, etc.) by a hand of a user; e.g., such that the probe housing is approximately the size of a pen or pencil. The housing length 40, for example, may be sized between about four to six inches, the housing width 46 may be sized between about one half to one and one half inches, and/or the housing thickness 52 may be sized between about one half to one and one half inches.

The probe housing 34 may include a base segment 58, and intermediate segment 60, and a tip segment 62. The base segment 58 extends longitudinally between the first housing end 42 and the intermediate segment 60. The intermediate segment 60 extends longitudinally between the base segment 58 and the tip segment 62. The tip segment 62 extends longitudinally between the intermediate segment 60 and the second housing end 44.

FIG. 4 is a partial front sectional illustration of the capacitance probe 36 and the non-conductive spacer 38. FIG. 5 is a cross-sectional illustration of the capacitance probe 36. Referring to FIGS. 4 and 5, the capacitance probe 36 may include a conductive sensor element 64, a conductive guard 66, dielectric material 68 and a non-conductive shield 70, each of which extends longitudinally to a probe tip 72. The sensor element 64 includes a sensor surface 74 (e.g., an active sensor area) that is located at the probe tip 72. Referring to FIG. 5, the sensor surface 74 has a surface thickness 76 and a surface width 78. The surface width 78 may be greater than the surface thickness 76, which may provide the sensor surface 74 with an elongated (e.g., rectangular) geometry. The guard 66 may include one or more guard plates 80. The sensor element 64 is arranged between the guard plates 80. The dielectric material 68 is arranged between, and electrically decouples the sensor element 64 and the guard plates 80. The non-conductive shield 70 wraps around respective sides of the sensor element 64, the guard 66, and the dielectric material 68.

Referring to FIG. 4, the non-conductive spacer 38 extends longitudinally between a probe contact surface 82 and a workpiece contact surface 84, and may be constructed from a non-conductive material having a relatively low permittivity (e.g., between about two to one hundred relative permittivity). Examples of such non-conductive materials may include plastic, ceramic, polytetrafluoroethylene and/or 9-[2-(phosphonomethoxy)ethyl]adenine (PMEA).

The non-conductive spacer 38 is connected (e.g., fixedly or removably) to the capacitance probe 36 with, for example, adhesive. The probe contact surface 82 covers (e.g., extends completely over) the probe tip 72 and, thus, the sensor surface 74. Referring to FIGS. 2 and 3, the capacitance probe 36 is mounted to the tip segment 62. The capacitance probe 36, for example, may be partially inserted within and secured to the tip segment 62, and may extend longitudinally out from the second housing end 44 to the probe tip 72.

Referring to FIG. 1, the radius gage 26 and, more particularly, the capacitance probe 36 receives power from (e.g., is hardwired to) the power source 28, and is in signal communication with (e.g., hardwired or wirelessly connected to) the metering device 30. The metering device 30 is in signal communication with (e.g., hardwired or wirelessly connected to) the processing device 32. The power source 28, the metering device 30 and the processing device 32 may be configured (e.g., housed) within a base station 86 (e.g., a computer). It is contemplated, however, that the power source 28, the metering device 30 and/or the processing device 32 may alternatively be housed within the probe housing. Referring to FIG. 2, for example, the metering device 30 and one or more power source controls 89 and 91 may be housed in the base segment 58. The metering device 30 may include a voltage indicator 93, and the power source controls may include a bias setting dial 89 and a gain setting dial 91.

Figure 6:
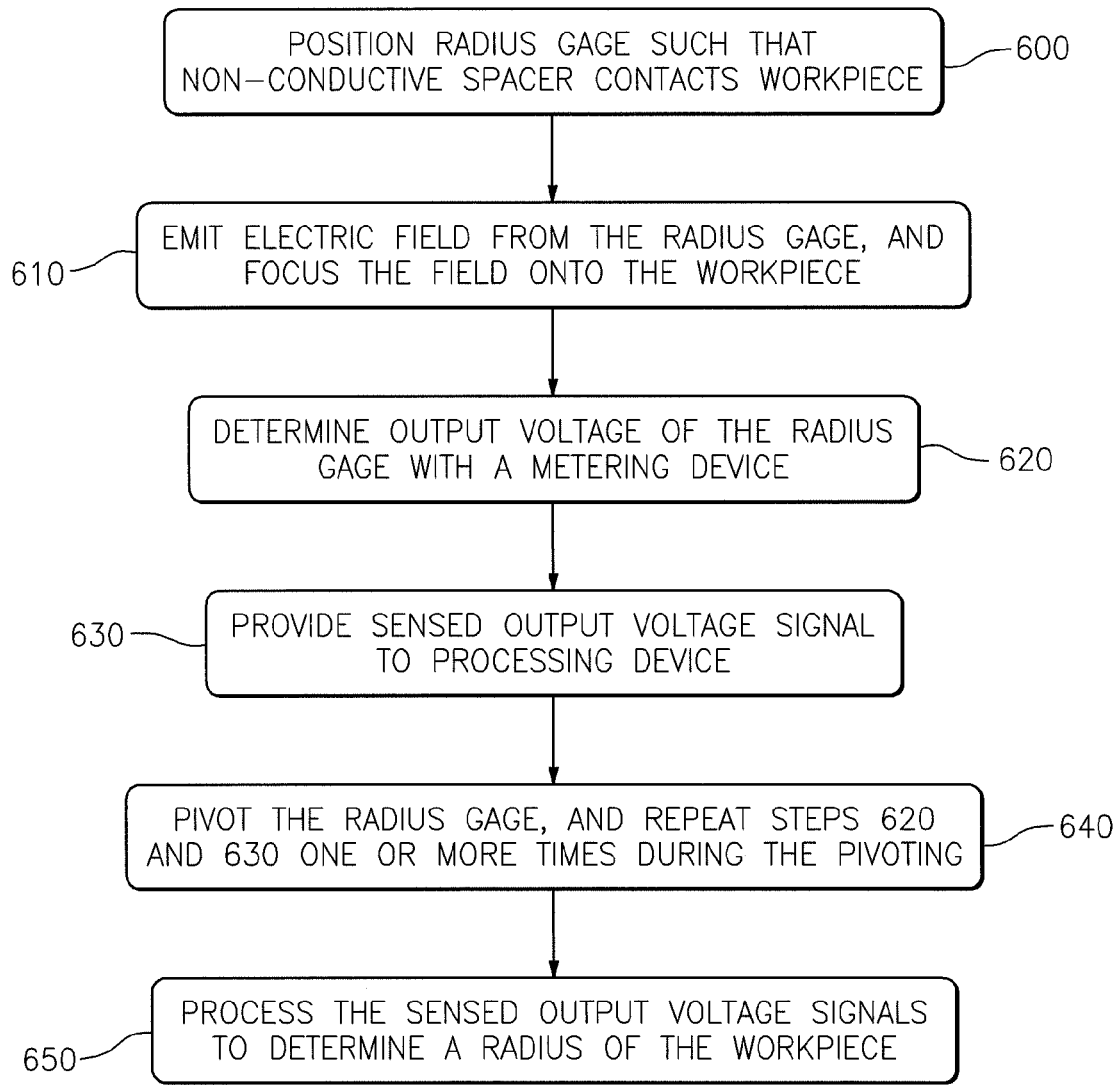
FIG. 6 is a flow diagram of a method for measuring a radius of a workpiece.

FIG. 6 is a flow diagram of a method for operating the apparatus 20 to measure the radius 22 of the workpiece 24 (e.g., a gas turbine engine blade root). Referring to FIGS. 1 and 6, in step 600, the radius gage 26 is positioned such that the workpiece contact surface 84 contacts a workpiece edge 87 of the workpiece 24. The radius gage 26 may be positioned, for example, by a hand of a user to contact the tip of a radius in order to characterize the radius. Once the workpiece contact surface is in contact with the radius of the workpiece to be determined, the apparatus is rocked across atop the radius to be determined. The output voltage from the apparatus is at a low value when the workpiece contact surface is parallel with the plane that bisects the included angle of the corner. The affective area of the capacitor formed by the workpiece contact surface and the workpiece increases for increasing radius.

FIG. 7 is a partial side sectional illustration of the capacitance probe 36 and the workpiece 24. Referring to FIGS. 6 and 7, in step 610, the sensor element 64 emits an electric field from the sensor surface 74, which is focused onto the workpiece 24 by the guard 66 (see FIG. 5). The electric field may create an electrostatic field 88 between the sensor element 64 and the workpiece 24, which may form the sensor element 64 and the workpiece into respective plates of a capacitor. The electrostatic field 88 has a field strength that may change (e.g., increase or decrease) along the surface width 78 where longitudinal distance between the sensor element 64 and the workpiece 24 changes.

Referring to FIGS. 1 and 6, in step 620, the metering device 30 measures changes in current or voltage supplied to the capacitance probe 36 from the power source 28, and converts the measured changes into an output voltage. The output voltage is indicative of the field strength of the electrostatic field 88.

In step 630, the sensed output voltage is provided to the processing device 32.

Referring to FIGS. 6 and 8, in step 640, the capacitance probe 36 is pivoted (e.g., between about +/− fifteen to thirty degrees) about the workpiece edge 87, and steps 620 and 630 are repeated one or more times during the pivoting. As the capacitance probe 36 is pivoted, the output voltage may change due to corresponding changes in the field strength of the electrostatic field 88. FIG. 9 graphically illustrates changes in output voltage (y-axis) versus degrees pivoted (θ-axis) by the capacitance probe 36 for a plurality of workpieces with different edge radiuses (e.g., edge profiles). A first curve 90, for example, graphically illustrates how the output voltage changes as the capacitance probe 36 is pivoted about a first workpiece edge with a first radius. A second curve 92 graphically illustrates how the output voltage changes as the capacitance probe 36 is pivoted about a second workpiece edge with a second radius that is less than the first radius.

Figure 10:
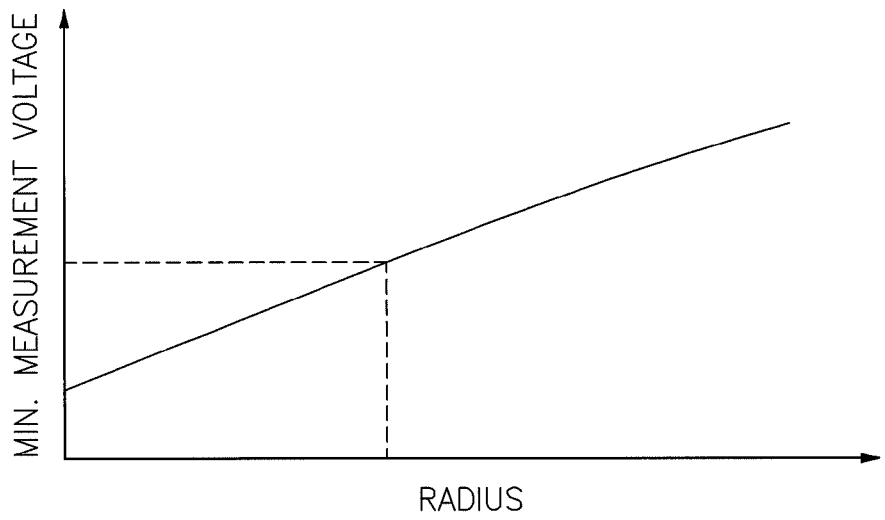
FIG. 10 graphically illustrates a calibration curve that relates predetermined minimum measurement voltages to known radii.

In step 650, the processing device 32 processes the sensed output voltage signals received in step 630 to determine the radius 22 of the workpiece edge 87. The processing device 32, for example, may determine a minimum sensed output voltage from the sensed output voltage signals. Referring to FIGS. 7 and 9, the first curve 90 and the second curve 92 each may exhibit a respective minimum sensed output voltage 94, 96 where, for example, an imaginary line 98 that extends perpendicularly away from the sensor surface 74 bisects an included angle 100 of the respective workpiece edge 87. The processing device 32 may, for example, compare the minimum sensed output voltage to a calibration curve (or a look-up-table) that relates various predetermined minimum sensed output voltage to known radii. FIG. 10 is an example of such a calibration curve.

In some embodiments, the steps 620, 630, 640 and 650 may be repeated one or more times. The resultant measurement voltages may be averaged by the processing device 32, and the average measurement voltage may be processed to determine the radius 22 of the workpiece edge 87.

In addition, the apparatus 20 may be used to measure a radius of an inside corner of a workpiece.

Figure 11:
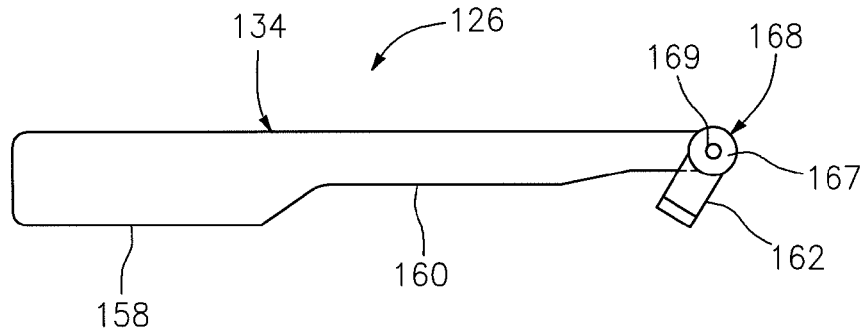
FIG. 11 is a side view illustration of an alternate embodiment electronic radius gage.
Figure 12:
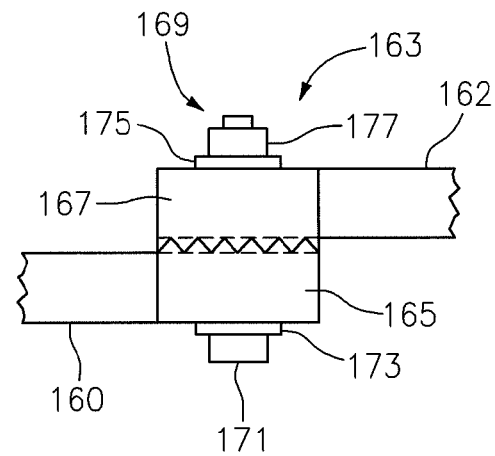
FIG. 12 is a front view illustration of an elbow hinge included in the radius gage illustrated in FIG. 11.

FIG. 11 is a side view illustration of an electronic radius gage 126 that includes an alternate embodiment probe housing 134. In contrast to the probe housing 34 illustrated in FIG. 3, the probe housing 134 also includes an elbow hinge 163 that pivotally connects the intermediate segment 160 to the tip segment 162. FIG. 12 is a front view illustration of the elbow hinge 163, and the hinge may include a first toothed hinge segment 165, a second toothed hinge segment 167 and a fastener 169. The fastener 169 may include a bolt 171, a washer 173, a spring element 175 (e.g., a helical spring element) and a nut 177. The first toothed hinge segment 165 is connected to the intermediate segment 160. The second toothed hinge segment 167 is connected to the tip segment 162. The first toothed hinge segment 165 and the second toothed hinge segment 167 are connected together by the bolt 171, the washer 173, the spring element 175 and the nut 177.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. An apparatus for measuring a workpiece, comprising:
a probe housing;
a capacitance probe mounted to the probe housing, and comprising a probe tip with a sensor surface that emits an electric field;
a non-conductive spacer extending between a probe contact surface and a workpiece contact surface, wherein the probe contact surface covers the sensor surface, and the workpiece contact surface contacts the workpiece during the measuring;
a metering device that is configured in communication with the capacitance probe, and that provides a voltage signal indicative of a field strength of an electrostatic field between the sensor surface and the workpiece; and
a processing device that provides a radius signal based on the voltage signal.

2. The apparatus of claim 1, wherein the capacitance probe is utilized to measure a radius of the workpiece.

3. The apparatus of claim 1, wherein the non-conductive spacer comprises at least one of plastic, ceramic, polytetrafluoroethylene and 9-[2-(phosphonomethoxy)ethyl]adenine.

4. The apparatus of claim 1, wherein the non-conductive spacer comprises a permittivity less than approximately two and one hundred.

5. The apparatus of claim 1, wherein the sensor surface comprises a surface thickness and a surface width that is greater than the surface thickness.

6. The apparatus of claim 5, wherein the probe tip comprises a rectangular geometry.

7. The apparatus of claim 1, wherein the probe housing comprises a handheld probe housing.

8. The apparatus of claim 1, wherein the probe housing comprises a base segment connected to a tip segment that moves relative to the base segment, and wherein the capacitance probe is mounted to the tip segment.

9. The apparatus of claim 1, further comprising a power source connected to the capacitance probe.

10. The apparatus of claim 1, further comprising a base station that houses the metering device and the processing device.

11. An apparatus for measuring a workpiece, comprising:
a probe housing;
a capacitance probe mounted to the probe housing, and comprising a probe tip with a sensor surface that emits an electric field; and
a non-conductive spacer extending between a probe contact surface and a workpiece contact surface, wherein the probe contact surface covers the sensor surface, and the workpiece contact surface contacts the workpiece during the measuring;
wherein the capacitance probe further comprises a sensor element, a guard that focuses the electric field emitted from the sensor surface, and a dielectric material arranged between the sensor element and the guard, wherein the sensor element comprises the sensor surface, and wherein the sensor element, the guard and the dielectric material extend to the probe tip.

12. The apparatus of claim 11, wherein the probe contact surface covers the probe tip.

13. The apparatus of claim 12, wherein the guard comprises a pair of guard plates, and the sensor element is arranged between the guard plates.

14. The apparatus of claim 13, wherein the capacitance probe further comprises a non-conductive shield that extends around respective sides of the sensor element, the guard and the dielectric material.

\* \* \* \* \*